United States Patent [19]

Makhoul et al.

[11] Patent Number: 5,933,525

[45] Date of Patent: *Aug. 3, 1999

[54] LANGUAGE-INDEPENDENT AND SEGMENTATION-FREE OPTICAL CHARACTER RECOGNITION SYSTEM AND METHOD

[75] Inventors: John I. Makhoul, Winchester; Richard M. Schwartz, Sudbury, both of Mass.

[73] Assignee: BBN Corporation, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/630,162

[22] Filed: Apr. 10, 1996

[51] Int. Cl.$^6$ .............................. G06K 9/48; G06K 9/80
[52] U.S. Cl. ...................... 382/186; 382/192; 382/228; 382/185
[58] Field of Search .................................. 382/192, 187, 382/228, 312, 323, 224, 185–186, 139, 230

[56] References Cited

U.S. PATENT DOCUMENTS

| | | | |
|---|---|---|---|
| 4,809,351 | 2/1989 | Abramovitz et al. | 382/313 |
| 5,062,143 | 10/1991 | Schmitt | 382/230 |
| 5,343,537 | 8/1994 | Bellegarda et al. | 382/186 |
| 5,438,630 | 8/1995 | Chen et al. | 382/159 |
| 5,544,257 | 8/1996 | Bellegarda et al. | 382/187 |
| 5,757,960 | 5/1998 | Murdock et al. | 382/187 |
| 5,787,198 | 7/1998 | Agazzi et al. | 382/196 |
| 5,862,259 | 1/1999 | Bokser et al. | 382/228 |

FOREIGN PATENT DOCUMENTS

WO 93/18483  9/1993  WIPO .

OTHER PUBLICATIONS

Bose et al. "Connected and Degraded Text Recognition Using Hidden Markov Model." Proceedings. 11th IAPR International Conference on Pattern Recognition. vol. II. pp. 116–119, Sep. 1992.

Kaltenmeier et al. "Sophisticated Topology of Hidden Markov Models for Cursive Script Recognition." Proceedings of the Second International Conference on Document Analysis and Recognition, pp. 139–142, Oct. 1993.

Sin et al. "A Statistical Approach with HMMs for On–Line Cursive Hangul (Korean Script) Recognition." Proceedings of the Second International Conference on Document Analysis and Recognition, pp. 147–150, Oct. 1993.

Bippus et al. "Cursive Script Recognition Using Semi Continuous Hidden Markov Models in Combination with Simple Features." IEE European Workshop on Handwriting Analysis and Recognition: A European Perspective, pp. 6/1–6, Jul. 1994.

(List continued on next page.)

*Primary Examiner*—Jon Chang
*Attorney, Agent, or Firm*—Leonard Charles Suchyta

[57] ABSTRACT

A language-independent and segment free OCR system and method comprises a unique feature extraction approach which represents two dimensional data relating to OCR as one independent variable (specifically the position within a line of text in the direction of the line) so that the same CSR technology based on HMMs can be adapted in a straight-forward manner to recognize optical characters. After a line finding stage, followed by a simple feature-extraction stage, the system can utilize a commercially available CSR system, with little or no modification, to perform the recognition of text by and training of the system. The whole system, including the feature extraction, training, and recognition components, are designed to be independent of the script or language of the text being recognized. The language-dependent parts of the system are confined to the lexicon and training data. Furthermore, the method of recognition does not require pre-segmentation of the data at the character and/or word levels, neither for training nor for recognition. In addition, a language model can be used to enhance system performance as an integral part of the recognition process and not as a post-process, as is commonly done with spell checking, for example.

36 Claims, 5 Drawing Sheets

OTHER PUBLICATIONS

Gonzalez and Woods, "Digital Image Processing", Addison–Wesley Pub. Co., pp. 416–418, 1992.

E. Levin and R. Pieraccini, "Dynamic Planar Warping for Optical Character Recognition," *IEEE Int. Conf. Acoustics, Speech, Signal Processing,* San Francisco, CA, pp. 111–149–111–152, Mar. 1992.

J.C. Anigbogu and A. Belaïd, "Performance Evaluation of an HMM Based OCR System," *Proc. 11th Int. Pattern Recognition,* The Hague, The Netherlands, pp. 565–568, Aug. 1992.

G. Kopec and P. Chou, "Document Image Decoding Using Markov Source Models," *IEEE Int. Conf. Acoustics, Speech, Signal Processing,* Minneapolis, MN, pp. V–85–88, Apr. 1993.

O.E. Agazzi and S. Kuo, "Hidden Markov Model Based Optical Character Recognition in the Presence of Deterministic Transformations," *Pattern Recognition,* vol. 26, No. 12, pp.

T. Starner, J. Makhoul, R. Schwartz and G. Chou; On–Line Cursive Handwriting Recognition Using Speech Recognition Methods; *IEEE International Conference on.*

A. Kundu and P. Bahl, "Recognition of Handwritten Script: a Hidden Markov Model Based Approach," *IEEE Int. Conf. Acoustics, Speech, Signal Processing,* New York, NY, pp.

J.A. Vlontzos and S.Y. Kung, "Hidden Markov Models for Character Recognition," *IEEE Trans. Image Processing,* pp. 539–543, Oct. 1992.

H.–S. Park and S.–W. Lee, "Off–line Recognition of Large–set Handwritten Characters with Multiple Hidden Markov Models," *Pattern Recognition,* vol. 29, No. 2, pp. 231–244, 1996.

G.D. Forney, "The Viterbi algorithm," *Proc. IEEE,* vol. 61, pp. 268–278, 1973.

L. Nguyen, T. Anastasakos, F. Kubala, C. LaPre, J. Makhoul, R. Schwartz, N. Yuan, G. Zavaliagkos, and Y. Zhao, "The 1994 BBN/BYBLOS Speech Recognition System," *Proc.*

R.M. Schwartz, Y. Chow, S. Roucos, M. Krasner, and J. Makhoul, "Improved Hidden Markov Modeling of Phonemes for Continuous Speech Recognition," *IEEE Int. Conf.*

J. Bellegarda and D. Nahamoo, "Tied Mixture Continuous Parameter Models for Large Vocabulary Isolated Speech Recognition," *IEEE Int. Conf. Acoustics, Speech, Signal.*

J. Makhoul, S. Roucos, H. Gish. "Vector Quantization in Speech Coding," *Proc. IEEE,* vol. 73, No. I 1, pp. 1551–1588, Nov. 1985.

L. Rabiner, "A Tutorial on Hidden Markov Models and Selected Applications in Speech Recognition," *Proc. IEEE,* vol. 77, No. 2, pp. 257–286, Feb. 1989.

B. Al–Badr and S. Mahmoud, "Survey and bibliography of Arabic optical text recognition," *Signal Processing,* vol. 41, No. 1, pp. 49–77, 1995.

I.T. Phillips, S. Chen, and R.M. Haralick, "CD–ROM document database standard," Proc. *Int. Conf. Document Analysis and Recognition,* Tsukuba City, Japan, pp. 478–483, Oct.

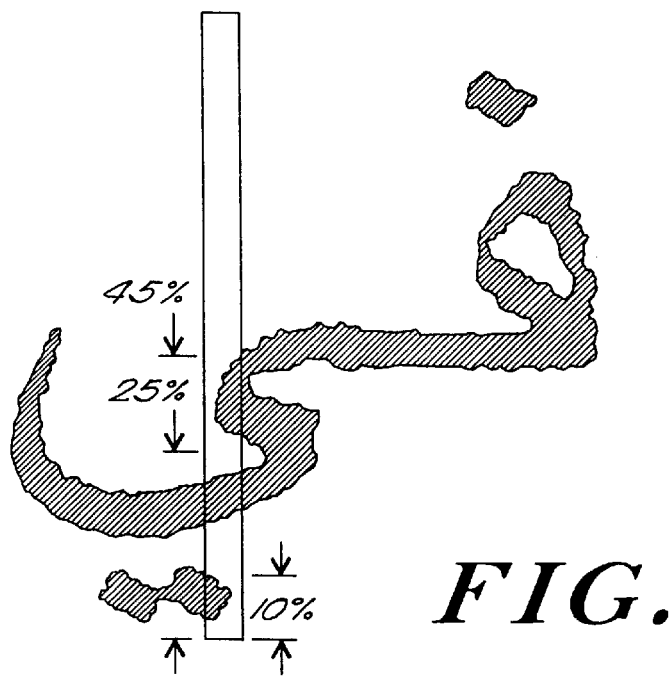
FIG. 3
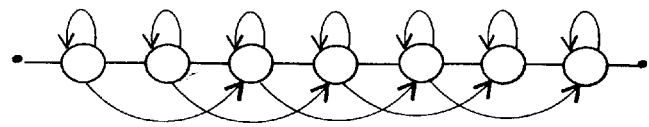
FIG. 4
| تج ر ب | ك ة ب ة | ل ن م ل أ | ل ي م ل | a |
|---|---|---|---|---|
| تجرب | كنية | لنملأ | يمل | b |
FIG. 5

|  | MULTI-FONT |
|---|---|
| BOOKS | 3.7 |
| NEWSPAPERS | 2.0 |
| MAGAZINES | 1.5 |
| COMPUTER FONTS | 1.0 |
| AVERAGE | 1.9 |

FIG. 7

|  | 1-FONT | MULTI-FONT |
|---|---|---|
| GEEZA | 0.6 | 0.7 |
| BAGHDAD | 0.6 | 0.8 |
| KUFI | 0.3 | 2.4 |
| NADIM | 0.4 | 0.6 |
| AVERAGE | 0.4 | 1.0 |

FIG. 8

LANGUAGE-INDEPENDENT AND SEGMENTATION-FREE OPTICAL CHARACTER RECOGNITION SYSTEM AND METHOD

THE FIELD OF INVENTION

The present invention is related to continuous recognition of optical characters independent of the language of the text and free of any word or character segmentation.

BACKGROUND OF THE INVENTION

Most of the known optical character recognition (OCR) methods have essentially two characteristics in common. First, each includes a recognition methodology that starts with a pre-segmentation stage in which a line of text is first segmented into words and/or characters, followed by a separate character recognition stage. The use of word and/or character segmentation with subsequent feature extraction for image recognition is described, for example, in U.S. Pat. No. 5,438,630 issued Aug. 1, 1995 to Chen et al. Second, each method is language dependent requiring that both separate training and recognition systems be designed specifically for each language.

A template-based OCR method has been suggested which does not require pre-segmentation. However, this method has difficulty recognizing patterns because of intra-class variability of the patterns (see PCT/US93/01843 (international publication number WO93/18483), page 8) and is not language independent.

There are several references in the literature to OCR systems based on statistical modeling using Hidden Markov Models (HMMs). See, for example, [1] E. Levin and R. Pieraccini, "Dynamic Planar Warping for Optical Character Recognition," *IEEE Int. Conf. Acoustics, Speech, Signal Processing*, San Francisco, Calif., pp. 111–149—111–152, March 1992; [2] J. C. Anigbogu and A. Belaïd, "Performance Evaluation of an HMM Based OCR System," *Proc. 11th Int. Pattern Recognition*, The Hague, The Netherlands, pp. 565–568, August 1992; [3] G. Kopec and P. Chou, "Document Image Decoding Using Markov Source Models," *IEEE Int. Conf. Acoustics, Speech, Signal Processing*, Minneapolis, Minn., pp. V-85–88, April 1993; and [4] O. E. Agazzi and S. Kuo, "Hidden Markov Model Based Optical Character Recognition in the Presence of Deterministic Transformations," *Pattern Recognition*, Vol. 26, No. 12, pp. 1813–1826, 1993. However, none of these references suggests that these systems are independent of the script or language used or that the features extracted for analysis are independent of language type. Further, the use of HMMs for character recognition presents problems as HMM models are more suited for use with continuous speech recognition (CSR) systems where there is only one independent variable, i.e., time, while in the above-identified referenced articles [1]–[4], the system responds to two independent variables.

On-line handwriting recognition systems have been designed which compute feature vectors as functions of time. See, for example, [5] T. Starner, J. Makhoul, R. Schwartz and G. Chou; "On-Line Cursive Handwriting Recognition Using Speech Recognition Methods; *IEEE International Conference on Acoustics, Speech, and Signal Processing*, Adelaide, Austrailia, Apr. 19–22, 1994, Vol. V. pp. 125–128. However, OCR applications are faced with the problem of recognizing a whole page of text which presents a two-dimensional problem for which there is no obvious way of defining a feature vector as a function of one independent variable. So the problem of how to apply HMMs to OCR needs to be satisfactorily addressed.

OBJECTS OF THE INVENTION

It is an object of the present invention to provide an improved OCR system and method which substantially reduces or overcomes the above-noted problems of the prior art.

More specifically, it is an object of the present invention to provide an improved OCR system and method including a feature extraction technique of generating a signal representative of scanned text and as a function of only one independent variable (specifically, position within a line).

Another object of the present invention is to provide an improved OCR system and method using a probabalistic paradigm, and more specifically a HMM, for each known character of the text.

And another object of the present invention is to model an OCR system and method so that the system and method can recognize text independent of the language of the text.

And still another object of the present invention is to provide an OCR system and method in which the language dependence of the system is limited to the lexicon and training data used with the system and method.

Yet another object of the present invention is to provide an improved OCR system and method using a continuous approach for recognizing characters without the need to first segment the characters or words of text being scanned.

Still another object of the present invention is to provide an improved OCR system and method having a high degree of accuracy for the vast majority of the world's scripts.

SUMMARY OF THE INVENTION

A language-independent OCR system and method comprises a unique feature extraction approach which represents two dimensional data relating to OCR as one independent variable (specifically, the position within and in the same direction of a line of text) so that the same CSR technology based on HMMs can be adapted in a straightforward manner to recognize optical characters. After a line finding stage, followed by a simple feature-extraction stage, the system can utilize a well known CSR system, with little or no modification, to perform the recognition of text by and training of the system. The whole system, including the feature extraction, training, and recognition components, are designed to be independent of the script or language of the text being recognized. The language-dependent parts of the system are confined to the lexicon and training data. Furthermore, the method of recognition does not require pre-segmentation of the data at the character and/or word levels, neither for training nor for recognition. In addition, a language model can be used to enhance system performance as an integral part of the recognition process and not as a post-process, as is commonly done with spell checking, for example.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

FIG. 3 illustrates the analytic features of the feature extraction technique of using the percentile ratio of the intensity of the portion of the text in each frame in order to normalize the data so that it is independent of the position within a line of text;

FIG. 4 is an example of a hidden Markov model (HMM) for characters;

FIG. 5 is an example of Arabic words, written (a) with the characters isolated from one another and (b) as they typically appear in print;

FIG. 6 is a sample representation from the ARPA Arabic OCR Corpus;

FIG. 7 is a table of multi-font percent character error rates for 208 pages of the ARPA OCR Arabic Corpus;

FIG. 8 is a table of percent character error rates for four computer fonts under single-font and multi-font training conditions;

DETAILED DESCRIPTION OF THE DRAWINGS

Figure 1:
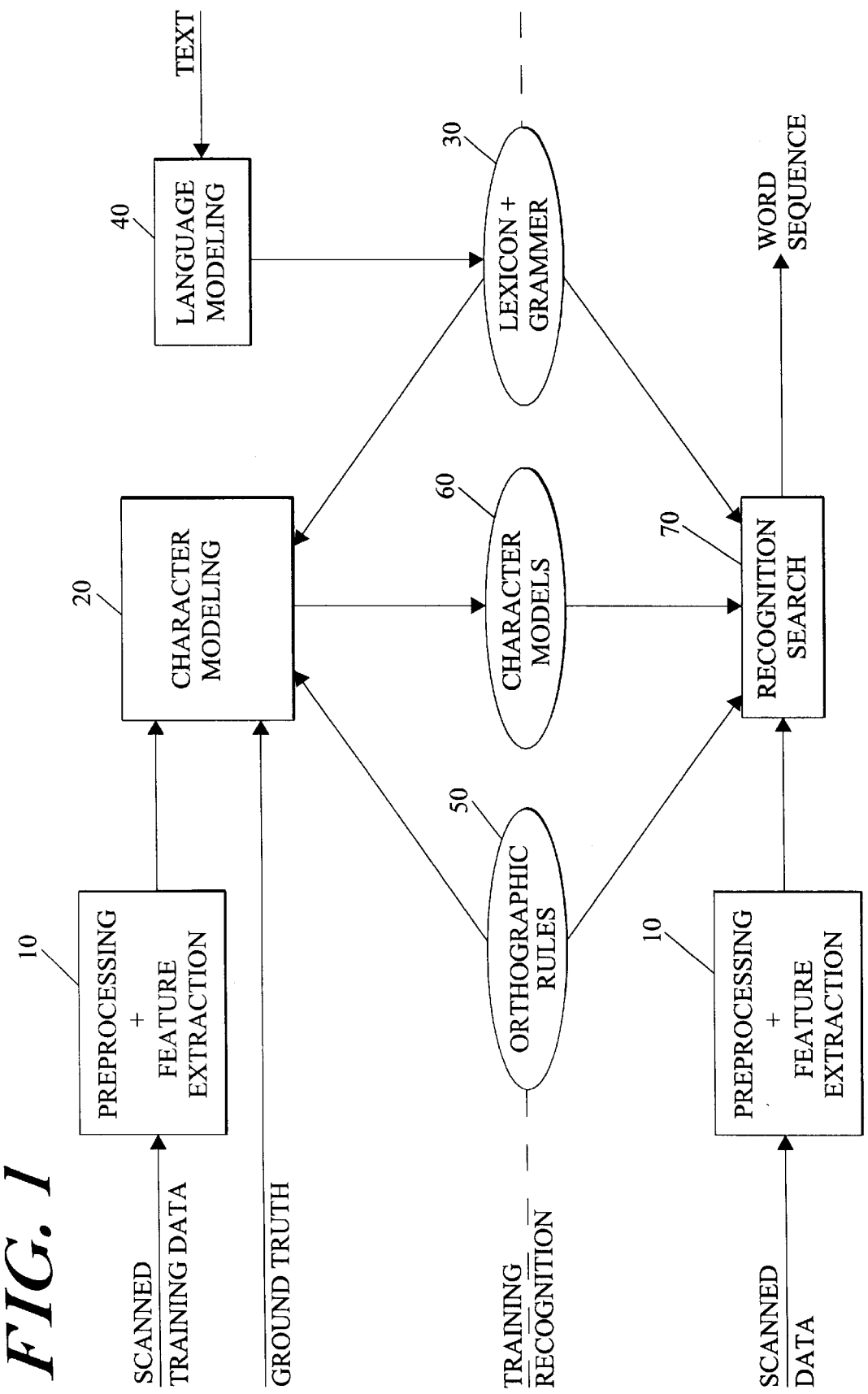
FIG. 1 is a block diagram of the preferred embodiment of the OCR system of the present invention.

As previously mentioned, there have been a number of attempts to use HMMs in OCR. See, for example, references [1]–[4], supra, [6] A. Kundu and P. Bahl, "Recognition of Handwritten Script: a Hidden Markov Model Based Approach," *IEEE Int. Conf. Acoustics, Speech, Signal Processing*, New York, N.Y., pp. 928–931, April 1988; [7] J. A. Vlontzos and S. Y. Kung, "Hidden Markov Models for Character Recognition," *IEEE Trans. Image Processing*, pp. 539–543, October 1992; and [8] H.-S. Park and S.-W. Lee, "Off-line Recognition of Large-set Handwritten Characters with Multiple Hidden Markov Models," *Pattern Recognition*, Vol. 29, No. 2, pp. 231–244, 1996. The system of the present invention is an improvement over the prior art attempts to use HMMs because the whole system (feature extraction, training, and recognition) is intended and designed to be continuous and language-independent, without the need to pre-segment each word or character of the text being recognized. The system uses a feature extraction technique which reduces the two-dimensional text into one dimension features, making it possible to use a commercially available CSR system to perform OCR.

By way of introduction the general probabilistic methodology used is first presented, including a brief introduction to hidden Markov models and a description of the general OCR system. In describing the various aspects of the system the power of the new methodology is demonstrated using an Arabic OCR corpus (hereinafter the "ARPA Arabic OCR corpus), which includes scanned text from a number of sources of varying quality. Arabic text is known to present special challenges to OCR because the characters are connected for the most part and the shape of each character changes depending on the neighboring characters.

1. Probabilistic Paradigm 1.1 Problem Setup

Given the scanned data from a line of text, the basic probabilistic paradigm of the present invention attempts to find that sequence of characters C that maximizes $P(C|X)$, the probability of the sequence of characters C, given a sequence of feature vectors X that represents the input text. Using Bayes' Rule, $P(C|X)$ can be defined as follows:

$$P(C|X)=P(X|C)P(C)/P(X). \qquad (1)$$

$P(X|C)$ is called the feature model and $P(C)$ the language model (or grammar). $P(X|C)$ is a model of the input data for any particular character sequence C; $P(C)$ is the a priori probability of the sequence of characters, which describes what is allowable in that language and with what probability; and $P(X)$ is the a priori probability of the data. Since $P(X)$ is the same for all C, maximizing $P(C|X)$ can be accomplished by maximizing the product $P(X|C) P(C)$.

The feature model $P(X|C)$ is approximated by taking the product of the component probabilities for the different characters, $P(X_i|c_i)$ where $X_i$ is the sequence of feature vectors corresponding to character $c_i$. The feature model for each character is given by a specific HMM. The language model $P(C)$ is described by a lexicon of allowable characters and words and by a statistical language model that can provide the probability of different sequences of words. The most popular language model used for recognition is an n-gram Markov model, which computes $P(C)$ by multiplying the probabilities of consecutive groups of n words in the sequence C. Typically, bigram (n=2) and trigram (n=3) statistical models are used.

1.2 Hidden Markov Models

A hidden Markov model (HMM) has the same structure as a Markov chain, with states and transition probabilities among the states, but with one important difference: associated with each state in a Markov chain is a single "output" symbol, while in a HMM, associated with each state is a probability distribution on all symbols. Thus, given a sequence of symbols produced by a HMM, one cannot unambiguously determine which state sequence produced that sequence of symbols; and thus, the sequence of states is hidden. However, one can compute the sequence of states with the highest probability of having produced the observed symbol sequence. If one associates symbols with feature vectors, then the recognition problem can be formulated as finding the sequence of states (or characters or words) that could have produced the sequence of feature vectors with the highest probability. Because of the Markov property of HMMs, the search for the most likely word sequence can be computed very efficiently using the Viterbi algorithm. See, for example, [9] G. D. Forney, "The Viterbi algorithm," *Proc. IEEE*, Vol. 61, pp. 268–278, 1973.

HMMs have several important properties that make them desirable:

a. HMMs provide a rigorous and yet flexible mathematical probabalistic model of variability in feature space as a function of an independent variable (time for speech and in the present invention position for text).

b. Segmentation and recognition are performed jointly using very efficient training and search techniques.

c. Training is performed automatically without any manual segmentation of data.

d. Higher level constraints (in the form of language models, for example) can be applied as part of the recognition process, instead of applying them as a post process.

e. The techniques are language-independent, requiring only sufficient training data and a lexicon from the new language in order to recognize that language.

Perhaps the most important of these properties is that the HMM parameters can be estimated automatically from training data, without the need to either pre-segment the data or align it with the text. The training algorithm requires (a) a set of scanned data to be used for training, (b) the transcription of the data into a sequence of words of text, and (c) a lexicon of the allowable set of characters and words.

The HMM training algorithm automatically estimates the parameters of the models and performs C, the segmentation and recognition simultaneously, using an iterative scheme that is guaranteed to converge to a local optimum.

1.3 Overall System

FIG. 1 shows a block diagram of the OCR system, which is identical to a well known speech recognition system designed by the current assignee as the BBN Byblos CSR system (and which is partially described in [10] L. Nguyen, T. Anastasakos, F. Kubala, C. LaPre, J. Makhoul, R. Schwartz, N. Yuan, G. Zavaliagkos, and Y. Zhao, "The 1994 BBN\BYBLOS Speech Recognition System," *Proc. ARPA Spoketi Language Systems Technology)*, Workshop, Austin, Tex., Morcan Kaufmann Publishers, pp. 77–81, January 1995, or other software based CSR system, and which can be used on a Unix Workstation, such as a Sun Sparc Station, or equivalent machine) but with the following exceptions: the input here is scanned images instead of speech, characters replace phonemes, and orthographic rules (see below) replace phonological rules. The system depends on the estimation of character models, as well as a lexicon and grammar, from training data.

Referring to FIG. 1, during training, scanned training data is applied to the input of the preprocessing and feature extraction components 10 of the system, described in greater detail hereinafter which generates one-dimensional data representative of the two dimensional images of the text being scanned. The output of the preprocessing and feature extraction components 10 is applied to one input of the character modeling component 20 of the system. Ground truth is also applied to the character modeling component 20. During training in order to build a lexicon and grammar, indicated at 30, text is applied to the input of a language modeling component 40 so that the lexicon and grammar 30 can be used by the character modeling component 20 during the training. In addition a set of orthographic rules 50 are previously established for use by the character modeling component 20. A set of character models 60 are generated by the character modeling component 20. Once trained the system can be used to scan text in the language for which the system has been trained, and for which the lexicon and grammar has been established. As shown in FIG. 1, scanned data from the text is provided to the same preprocessing and feature extraction component 10 for providing the stream of one dimensional data to a recognition search component 70, which in turn provides a highly accurate output recreating the scanned text.

During training, the training system takes scanned-text data, coupled with ground truth, as its input. Ground truth here is given as the sequence of words that correspond to the different lines in the input. Note that the location of the lines on the scanned page is not provided, nor is any segmentation or alignment between the scanned data and ground truth at the word or character level. After a preprocessing stage in which the page may be deskewed and lines of text are located in a manner well known in the OCR art, a set of features representative of the text are extracted in a manner to be described hereinafter. The character modeling component 20 then takes the feature vectors and the corresponding ground truth and estimates context-dependent character models indicated at 60. The character modeling component 60 also makes use of a lexicon 30 (and a grammar), which are obtained from a large text corpus using a language modeling component 40.

The training process also makes use of orthographic rules that depend on the type of script. For example, the rules state that the text consists of text lines and tell whether the lines are horizontal (e.g., English, German, a Romance language, etc.) or vertical (e.g., Chinese), and whether the text is read from left-to-right (as in Roman script) or right-to-left (as in Arabic or Hebraic script). The rules may also specify which sets of characters can appear together as ligatures, a ligature being a combination of two or more letters that looks different from the simple concatenation of the letters. The rules could also specify other aspects of the writing structure, such as the diacritics in Arabic script, radical decomposition in Chinese script, and syllable structure in Korean Hangul script. Orthographic rules 50 are not always necessary, but they can serve to minimize the recognition search and to reduce the amount of training needed by providing prior information about the form that the models should take.

As mentioned, the recognition system in FIG. 1 has a preprocessing and feature extraction component 10 identical to that used in training. Then, using the output of the feature extraction, the recognition then uses the different knowledge sources estimated in the training, (character models, lexicon, grammar, and orthographic rules) to find the character sequence that has the highest likelihood in a manner known in CSR.

In the present system, all knowledge sources, shown as ellipses in FIG. 1, depend on the particular language or script. However, the whole training and recognition system, shown as rectangular boxes in FIG. 1, is designed to be language-independent. That means that the same basic system can be used to recognize most of the world's languages with little or no modification. This language independence has been demonstrated for speech recognition using HMMs and, in the present invention it can be demonstrated for OCR as well.

2. OCR System Detail

Details the preprocessing, and feature extraction stages, the HMM model structures used, and the training and recognition components are described below.

2.1 Preprocessing and Feature Extraction

In order to use HMMs for OCR, it is necessary to compute a feature vector as a function of an independent variable, which preferably is a one-dimensional variable. In CSR, the speech or acoustic signal is divided into a sequence of time-interval windows (called "frames") and a feature vector for each frame is computed. The independent variable is clearly time. The same method has been applied successfully to on-line handwriting recognition where a feature vector is computed also as a function of time. See, for example, reference [5], supra. However, in OCR, one is usually faced with the problem of recognizing a whole page of text, so there is no obviously natural way of defining a feature vector as a function of some independent variable and, in fact, different approaches have been taken in the literature. See, for example, references [1]–[4] and [6]–[8], supra. Preferably a line of text is chosen as the major unit for training and recognition, although other units will be evident to those skilled in the art. Therefore, a page is divided into a set of lines (which are assumed to be horizontal, without loss of generality) and the horizontal position along the line is used as the independent variable. Therefore, a line of text is preferably scanned in the direction it is normally read, e.g. from left to right for English, e.g., right to left for Arabic script. e.g., top to bottom for Chinese script (although it can be scanned in the opposite direction), and at each horizontal position, a feature vector is computed that represents a narrow vertical strip of the input, which is hereinafter called a "frame". The result is a feature vector as a function of horizontal position.

Prior to finding the lines, in a well known manner the skew angle of the page can be determined and the image deskewed so that the lines, in the case of horizontally-oriented script, are horizontal for the purpose of the scan. A horizontal projection of the page can then be used to help find the lines. For each line of text, the top and bottom of the line are determined. To the extent described: determining the skew, deskewing the image and finding the lines, can be accomplished using well known OCR scanning techniques. Once each line is located, the feature extraction can then be performed in accordance with the present invention.

Figure 2:
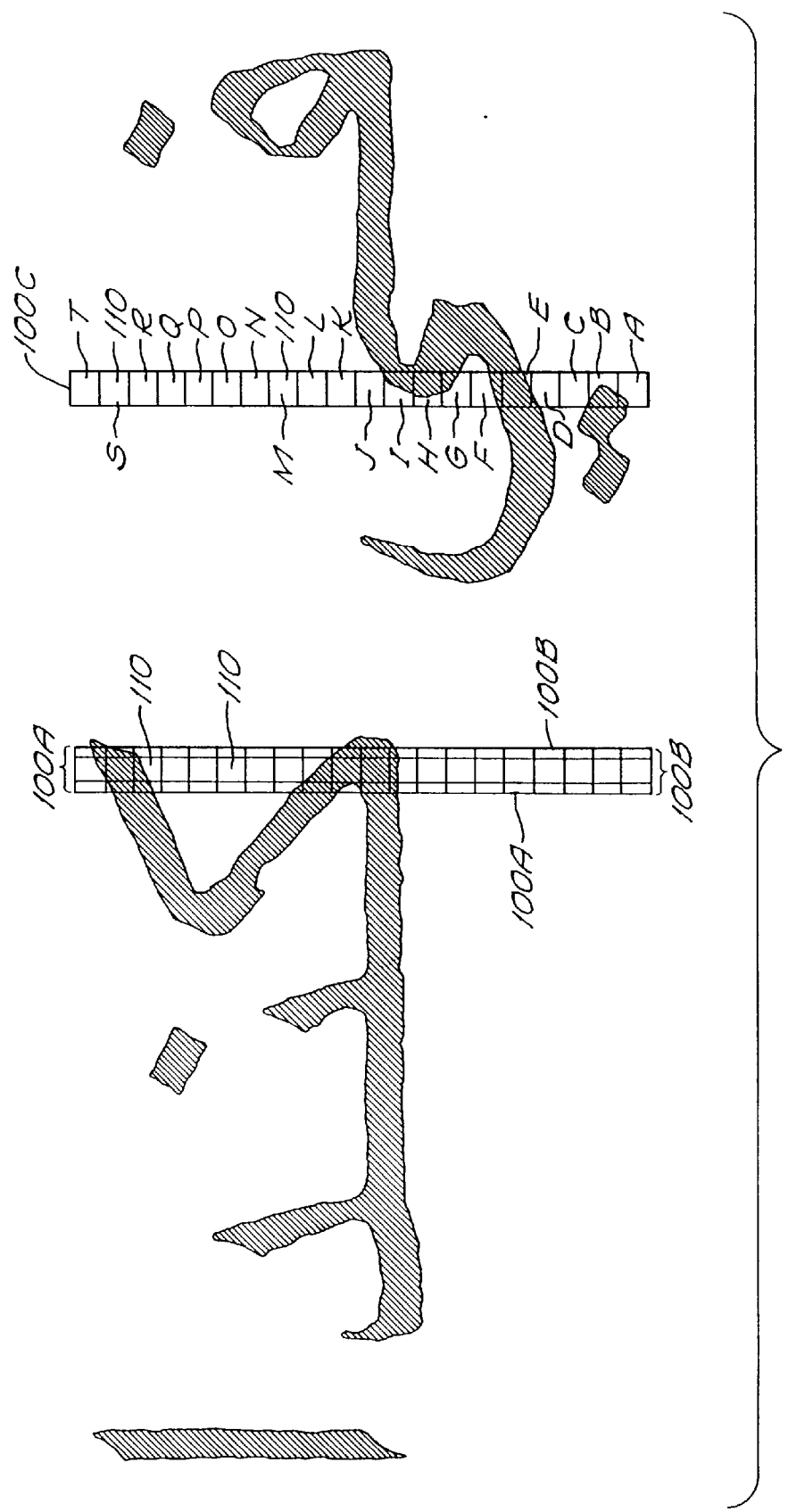
FIG. 2 illustrates a line of text and the input part of the feature extraction technique of how the line is divided into frames and each frame into cells in accordance with the preferred embodiment of the present invention.

Referring to FIG. 2, where Arabic letters of a line of text are shown, a line is divided into a sequence of overlapping frames, indicated, for example, at 100A and 100B, arranged sequentially in the direction of the scan, e.g., in the direction in which the text is normally read. In the case of horizontally read text, each frame is a narrow vertical strip with a height that is large enough to always cover the entire height of all of the characters of the language and font being scanned without including any part of the text that might be printed above or below the line being scanned, and a width that is a small fraction (typically about $\frac{1}{15}$) of the height of the line. The frames preferably overlap in the direction of the scan. The horizontal overlap from one frame to the next is a system parameter. For example, in one embodiment the overlap is equal to two-thirds of the frame width although the amount of overlap can vary. In addition, as shown in FIG. 2, each frame is divided into a plurality (e.g., 20) equal overlapping, vertically-aligned cells (again the amount of cell overlap is a system parameter) 110. The cells are preferably aligned along an axis (as shown in the vertical direction) perpendicular to the direction of the scan along the direction of the line. Each frame is taken at a certain horizontal position interval during the scan. Preferably, this is accomplished by making each cell of a matrix array of detectors, each for detecting whether the portion of the image sensed by the detector is light (not a part of the scanned text), or dark (a part of the scanned text), with adjacent cells sharing data from one or more adjacent rows of detectors between them. Detector matrices for detecting light and dark portions of a printed image are well known. Thus, each cell may comprise, for example, a 20×20 matrix array of photodetectors, with adjacent cells sharing one or more rows of photodetectors therebetween. Each detector of each cell provides an output signal representative of the intensity of the light that is detected within the space of the image exposed to the detector for each frame. This output signal can be compared to a threshold value so that signals above the threshold are considered not to contain a portion of the text being scanned, while signals below the threshold are considered to contain the portion of the text being scanned. Obviously, the threshold value can be adjusted depending on the condition of the document being scanned.

In the preferred embodiment of the present invention the features of the data for each frame detected by the detectors of the cells are language-independent and are preferably the following:

(1) is defined as the percentage of black pixels within each of the cells, A to T. In the example shown, cell A has approximately 10% black pixels, B has about 50%, and so on. Cells K through T have 0% black pixels;
(2) vertical derivative of intensity (across vertical cells);
(3) horizontal derivative of intensity (across overlapping frames); and
(4) local slope and correlation across a window of a plurality of cells, e.g., two cells square, i.e., the angle of any line within the window of cells.

Referring to FIG. 2, in one embodiment the first feature set (intensity as a function of vertical position) is defined as the percentage of black pixels within each of the cells, A to T. In the example shown, cell A has approximately 10% black pixels, B has about 50%, and so on. Cells K through T have 0%. The vertical and horizontal derivatives of intensity provide a measure of boundaries between the light and dark portions of the text; while the local slope and correlation (determined, for example, using a least means square test) across a window indicates the angle of a line. The vertical and horizontal derivatives of intensity provide a measure of boundaries between the light and dark portions of the text; while the local slope and correlation (determined, for example, using a least means square test) across a window indicates the angle of a line.

It should be noted that the above listing of features does not include features that require any form of partial recognition, such as sub-character pieces (e.g., there is a line here, a cross there, and a dot there), nor does it include features that are specific to a particular type of script.

Although the intensity features alone represent the entire image and would be sufficient to provide recognition, other features, such as vertical and horizontal derivatives, and local slope and correlation are also included, so as to include more global information. Inclusion of such features helps overcome the limitation imposed by the conditional independence assumption that is inherent in HMM models. The result is a set of 80 simple features (20 cells times 4 features). Using the feature vector computed as a function of position, the HMMs can be utilized to recognize the data.

2.2 Percentile Features

Although the features described in the previous section represent the image completely, and can be used for recognition, it has been found that these features are sensitive to accurate location of the frame with respect to the top and bottom of the line. For example, if the bottom of the frame is incorrectly located lower, then the intensity value that was previously assigned to cell A would now be assigned to cell B or C. This causes a degradation in recognition accuracy.

Accordingly a preferred set of features is used which are based on percentile heights that largely alleviate this problem. Thus, these features are used in the preferred embodiment.

FIG. 3 illustrates the definition of percentile heights. Rather than defining fixed cells, the total number of black pixels in the entire vertical frame are first computed. This number is then divided by a constant, for example, 20. Next, the height in the frame is found, at which 5% (in the example of 20 values) of the black pixels are below that height. This height is represented as a percentage of the height of the total frame. For example, in FIG. 3, we can see that 5% of the black pixels are below a height that is 10% of the total height of the frame. 50% of the pixels are below a height below about 25% of the total height of the frame, and 100% of the black pixels are below a height of about 45% of the height of the frame.

These percentile height features are much less sensitive to errors in the location of the top and bottom of the frame relative to the text, since a small error in the positioning of the top and bottom of the frame only change the percentile heights by a small amount. The vertical and horizontal derivatives of the percentile heights are also much less sensitive to errors in location of the top and bottom of the frame than the corresponding derivatives of the intensity features.

2.3 HMM Character Structure

The central model of the OCR system is the HMM of each type of character of the language of the text being scanned. For each model, it is necessary to specify the number of states and the allowable transitions among the states. Associated with each state is a probability distribution over the features. The model for a word then is a concatenation of the different character models.

The HMM character structure is a left-to-right structure that is similar to the one used in speech, as can be seen in FIG. 4. The loops and skips in FIG. 4 allow relatively large, nonlinear variations in horizontal position. During training and recognition, for any particular instance of a character, several of the input frames may get mapped to each of the states and other states may not be used at all. In the preferred system, 14 states for each of the character HMMs are used, although a different number of states can be used. More states can increase accuracy, but involve greater computation, and vice versa. A 14 state structure has been chosen subjectively to represent the characters with the greatest number of horizontal transitions. While it would be possible to model different characters with different numbers of states, it is believed easier to use the same number of states for each character.

(a) Context-Dependent Character Models

One of the major advances in speech recognition has been the use of contextdependent phonetic models to account for coarticulation between adjacent phonemes. That is, the parameters (probability distributions and transition probabilities) for each state in each phoneme depend to some extent on the identity of the preceding and following phonemes. In speech recognition, this reduces the error rates by a factor of two. See, for example, [11] R. M. Schwartz, Y. Chow, S. Roucos, M. Krasner, and J. Makhoul, "Improved Hidden Markov Modeling of Phonemes for Continuous Speech Recognition," *IEEE Int. Conf Acoustics, Speech, Signal Processing*, San Diego, Calif., pp. 35.6.1–4, March 1984. The same techniques have been found to apply as equally as well to on-line cursive handwriting recognition (see, for example, reference [5], supra), because the strokes of one letter are affected by the adjacent letters. In OCR, context-dependent models are especially appropriate for languages with cursive script (such as Arabic); for dealing with overlapping printed letters; and for modeling ligatures. FIG. 5 shows examples of a few Arabic words, each written with the characters isolated and as the word appears in normal print. Note that not all characters are connected inside a word and that the shape of a character depends on the neighboring characters. Even though a character can have different shapes, it is important to note that, in the system of the present invention, it is not necessary to provide this information explicitly in the system. The context dependence of the characters is modeled implicitly by including a separate model of each character in the context of all possible left and right characters (in a horizontal lined text). Furthermore, the transcription of text in the training data does not include any information about the shape of each character; only the identity of the basic character is given. It is one of the advantages of our system that such detailed information is not necessary for good performance.

(b) Probability Structure

Each state in the proposed HMMs has an associated probability density on the feature vector. For computational reasons, a structure that is known in the speech recognition literature as a tied-mixture Gaussian structure is employed. See, for example, [12] J. Bellegarda and D. Nahamoo, "Tied Mixture Continuous Parameter Models for Large Vocabulary Isolated Speech Recognition," *IEEE Int. Conf. Acoustics, Speech, Signal Processing*, Glasgow, Scotland, Vol. 1, pp. 13–16, May 1989. Additionally, the 80-dimensional feature vector is divided into 8 separate subvectors of 10 features each, which are modeled as conditionally independent—thus the probability densities can be expressed as a product of 8 probabilities, one for each subvector. The probability density corresponding to each subvector is modeled using a mixture of a shared pool of 64 Gaussian densities. The parameters for these densities are estimated using a clustering process that is run on a subset of the training data. See, for example, [13] J. Makhoul, S. Roucos, H. Gish. "Vector Quantization in Speech Coding," *Proc. IEEE*, Vol. 73, No. I 1, pp. 1551–1588, November 1985. Thus, each state has, for each of the 8 subvectors, 64 "mixture weights" (one for each Gaussian) that represent the probability density for that subvector.

(c) Training and Recognition

The training algorithm remains unchanged from that used in the Byblos speech recognition system. The scanned data is not required to be hand segmented nor aligned, neither at the character level nor at the word level, but only at the line level. The ground truth transcriptions, which specify the sequence of characters to be found on each line, need only be used. The probability densities corresponding to the states in the various HMMs are all initialized to be uniform densities. A forward-backward training algorithm to derive estimates of the model parameters can then be used. Such training algorithms are described, for example, in [14] L. Rabiner, "A Tutorial on Hidden Markov Models and Selected Applications in Speech Recognition," *Proc. IEEE*, Vol. 77, No. 2, pp. 257–286, February 1989. The resulting models maximize the likelihood of the training data. However, often there is insufficient training data to estimate robust probability distributions for all of the context-dependent models. Therefore, the distributions of similar states with insufficient training are clustered together and then the weights of these clustered states are retrained.

In addition to the character HMMs, a lexicon and a language model are also computed. These are usually obtained using a large text corpus. The lexicon contains the letters used to spell each word. The language model is usually a bigram or trigram model that contains the probabilities of all pairs or triples of words. Note that only the text is needed for language modeling; it is not necessary to have the corresponding scanned image. In this way, much larger amounts of text can be used to develop more powerful language models, without having to get more scanned training data.

The recognition algorithm is also identical to that used in the Byblos speech recognition system. Given the output of the analysis of a line of text, the recognition process consists mainly in a search for the most likely sequence of characters given the sequence of input features, the lexicon, and the language model. Although the Viterbi algorithm can be used, since the Viterbi algorithm would be quite expensive when the state space includes a very large vocabulary and a bigram or trigram language model, preferably a multi-pass search algorithm is used instead. Such algorithms are known for speech recognition. See, for example, reference [10], supra.

3. Experiments with Arabic Corpus

A series of experiments were performed on the ARPA Arabic OCR corpus. To demonstrate the effectiveness of approach of the present invention, the ARPA Arabic OCR Corpus, collected at SAIC, was chosen. This corpus consists of scanned Arabic text from a variety of sources of varying quality, including books, magazines, newspapers, and four Apple computer fonts (Geeza, Baghdad, Kufi, and Nadim). Samples of some of the pages in the corpus are shown in FIG. 6.

Arabic script provides a rich source of challenges for OCR. For example, (a) Connected Letters: Of 31 possible basic isolated letters, 24 can connect to others from the right and the left; six connect only to the right; and one letter does not connect to other letters at all. Since not all letters connect, word boundary location becomes an interesting challenge.

(b) Context Dependence: The shapes of letters chance— often radically—depending on the connectedness of neighboring letters; also, certain character combinations form new ligature shapes which are often font-dependent, and for example, where full line justification is employed.

(c) Dots: A significant number of letters are differentiated only by the number and position of dots in the letter.

(d) Diacritics: These are optional marks that are placed above or below characters and they mostly represent short vowels and consonant doubling.

For a discussion of the problems of applying OCR to Arabic text, see for example, [15] B. Al-Badr and S. Mahmoud, "Survey and bibliography of Arabic optical text recognition," *Signal Processing*, Vol. 41, No. 1, pp. 49–77, 1995.

In this effort, it was shown that the approach described herein deals very effectively and automatically with the connectedness of letters and the contextdependence of their shapes. The system is not given the rules for how shapes change as a function of the adjacent letters nor for how two or three letters might combine to form ligatures. Rather it implicitly learns these shapes implicitly by modeling each character in a context-dependent way. (Dealing with diacritics explicitly was beyond the scope of this study.) The ARPA Arabic Corpus consists of 345 pages of text, scanned and stored at 600 dots per inch. Associated with each image is the text transcription, indicating the sequence of characters on each line. But the location of the lines and the location of the characters within each line are not provided. The corpus transcription contains 80 unique characters, including punctuation and special symbols. Note, however, that the shapes of these characters can vary a great deal, depending on their context. The various shapes, including ligatures and context-dependent forms, were not identified in the ground truth transcriptions.

3.1. Experimental Conditions

During the experiments, it was necessary to remove all pages with untranscribed characters (mostly non-Arabic characters), horizontal straight lines, footnotes, and those for which the simple line finding algorithm that was implemented did not provide the correct number of lines. This left 208 pages (8150 lines) of which 62 pages (1300 lines) were from the four computer fonts and the remaining, 142 pages were from books, magazines, and newspapers, with a large number of unidentified fonts.

Experiments were run under two conditions: (a) font-dependent, in which the system was trained and tested on (different data) of each of the four computer fonts separately and tested on the same font, and (b) multi-font, in which the system was trained on data from the 208 pages and tested on other data from the same pages. Under both conditions, two thirds of the lines were taken from each page as training data and the rest were used as test data. No other training data was used to train the system. All experiments used a 30,000-word lexicon generated from all 345 pages of the corpus.

Because the amount of training text data in this corpus was not sufficient to estimate word bigram probabilities for most of the two-word sequences, it was decided to estimate what amounted to a unigram language model for the words, and a bigram model between the words and neighboring space and punctuation characters.

3.2 Evaluation Procedure

The character recognition error rate was measured following speech recognition conventions (i.e., the number of substitutions, deletions, and insertions, were added, with the sum divided by the total number of characters in the transcriptions provided). Each recognized line was aligned with ground truth (using dynamic programming) so as to minimize the error rate just defined. In initial experiments, it was found that about one-third of the errors were due to inserted or missing space characters. After examination of the data, it became clear that the placement of spaces in the printed Arabic texts was often arbitrary (some inter-word spaces were often smaller than intra-word spaces) and the sizes of what was called a space in ground truth varied a great deal. Therefore, it was decided to recompute the error rates such that a space error was counted only when it really mattered, namely, when the space error caused a word to be wrong.

3.3 Experimental Results

The table shown in FIG. 7 shows the results of a multi-font recognition experiment undertaken using the 208 pages, broken down according to the source of the data (the error rates for the individual computer fonts are broken down in the table of FIG. 8 under the multi-font column). The average character error rate for all sources was 1.9%. The error rate was highest for books (3.7%) and lowest for the computer fonts (1.0%). Generally, the data taken from books had very high variability (almost every page was from a different font) and was generally of lower print quality than the other sources.

Figure 9:
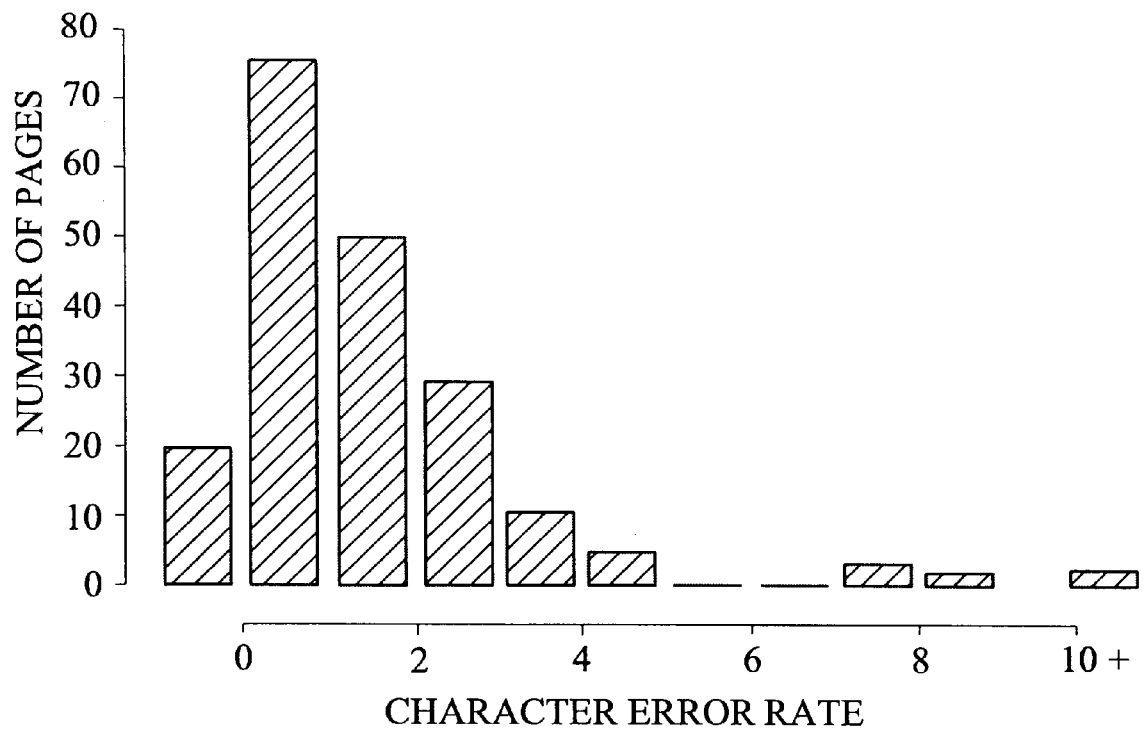
FIG. 9 is a histogram of character error rates plotted for all pages in the an experimental test.

FIG. 9 shows a histogram of error rates for all test data from the 208 pages. As shown, 21 of the pages had no errors at all and only 4 pages had an error rate of more than 10%. Most of the pages had error rates of less than 2%.

The table of FIG. 8 shows font-dependent (1-font) and multi-font test results for the four computer fonts. The first column, with the font-dependent results, shows an average character error rate of 0.4%. (Note that, on average, only 330 lines per font were used for training, which is not quite sufficient for very high accuracy.) The second column shows the multi-font error rates for the same computer font data (these are the results whose average is shown in FIG. 7). For three of the four fonts, there was a rather small and expected increase in error rate from the font-dependent experiment to the multi-font experiment. With respect to the results for the Kufi font, even though there are only about 10 pages of data for this font, it was easier to recognize this font in the font-dependent mode due to its greater degree of regularity (see the top line of FIG. 6). However, the error rate jumped significantly in the multi-font experiment, most likely because this stylized font is so radically different from all the other fonts.

4. Error Analysis

Figure 10:
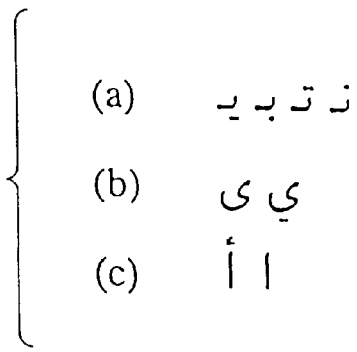
FIG. 10 shows three classes of characters that resulted in a significant number of confusions, as a result of certain performed experiments.

More than 70% of the character errors were errors in the alphabetic characters; the others were due to punctuations, numerals, special symbols, and diacritics. Of the alphabetic errors, there are certain classes of errors that were expected and easy to discern. However, many of the errors appear to be random and cannot be explained easily. FIG. 10 shows three classes of characters that resulted in a significant number of confusions. In FIG. 10a and 10b, the characters are differentiated from each other chiefly by the number of dots in the character, while in FIG. 10c the confusion is the presence or absence of a diacritic. However, a number of other classes of characters that are differentiated by dots only did not result in a significant number of errors. It is believed that this apparent anomaly is due to the fact that the recognition system employed a closed-vocabulary lexicon (i.e., all the words in the test were in the lexicon) and the lexicon did not contain a significant number of minimal pairs from those classes of characters.

5. Experiment with an English Corpus

To demonstrate the language independence of the methodology of the present invention, experiments with the University of Washington (UW) English Document Image Database I have been performed. See, for example, [16] I. T. Phillips, S. Chen, and R. M. Haralick, "CD-ROM document database standard," *Proc. Int. Conf. Document Analysis and Recognition*, Tsukuba City, Japan, pp. 478–483, October 1993. This corpus contains 958 pages scanned from technical articles at 300 dpi. Each page is divided into relatively, homogeneous zones, each of which is classified into one of 13 categories (e.g., text, table, text-with-special-symbols, math), and a ground truth transcription is provided. Of a total of 13,238 zones, 10,654 are text zones. For an initial experiment, only the text zones and only those with at least three lines (so as not to confuse our simple line finding algorithm) were used. That gives 2441 zones with a total of 19,664 lines. Using a random choice, two-thirds of the zones were taken for training and the remainder for test. The experiment utilized a closed-vocabulary lexicon of about 20,000 words taken from all the words in the training and test, and the size of the character set was 90.

In order to deal with this data, only two changes to the Arabic system were made: it was necessary to take into account that English is written left-to-right instead of right-to-left, and to parametrized the system to take other sampling rates (in this case 300 dpi instead of 600 dpi). Otherwise, the system was substantially identical to the one used for Arabic recognition, including the use of 14-state context-dependent HMMs, etc. In the experiment, a character error rate of 1.3% overall was obtained. The system was not tuned in any way to the English corpus, so there is much that can be done to reduce this error rate.

It has thus been demonstrated how speech recognition technology, based on hidden Markov models, can be used effectively for OCR. By using a feature extraction technique, that does not rely on segmentation, but instead represent the image data as a one-dimensional independent variable, a well known speech recognizer can be used to recognize text. Since the system and features chosen are not specific to any language, it is believed that the system and features are languageindependent.

Since certain changes may be made in the above apparatus and method without departing from the scope of the invention herein involved, it is intended that all matter contained in the above description or shown in the accompanying drawing shall be interpreted in an illustrative and not a limiting sense.

What is claimed is:

1. An optical character recognition system for recognizing each character of a text, comprising:

means for (a) determining the position of each line of characters of the text, (b) scanning each line of text by scanning said text in successive frames of a predetermined height and width independent of the script and language of said text, and (c) generating data representing all of the optically scanned characters of the text as a function of a single independent variable in one direction, said variable being a function of a feature vector representing a plurality of elements, each element being a function of the percentile height below which a prespecified percentage of black pixels lies;

means for providing a probabilistic paradigm so as to determine each of said characters of said text from said data.

2. The optical character recognition system of claim 1, wherein:

said means for generating data representing optically scanned text as a function of a single independent variable comprises means for scanning said text line by line in the same direction as said line.

3. The optical character recognition system of claim 2 wherein:

said means for scanning said text line by line in the same direction as said line includes means for scanning said text in successive frames of a predetermined height and width independent of the script and language of said text, but a function of the font size of the characters.

4. The optical character recognition system of claim 3, wherein:

said means for scanning said text in successive frames of a predetermined height and width independent of the script and language of said text includes means for scanning said text so that said frames overlap.

5. The optical character recognition system of claim 4, wherein:

said means for scanning said text in successive frames of a predetermined height and width independent of the size, shape and width of the font of said text includes means for dividing said frame into a plurality of cells.

6. The optical character recognition system of claim 5, further including:

means for dividing said frame into a plurality of cells so that said cells are aligned along an axis perpendicular to the direction of scanning said text.

7. The optical character recognition system of claim 6, wherein:

said means for dividing said frame into a plurality of cells divides said cells so that said cells are overlapping.

8. The optical character recognition system of claim 3, further including:

means for dividing each of said frames into an array of pixels, and wherein said means for generating data representing optically scanned text as a function of a single independent variable includes means for generating the data as a function of the intensity in each of said pixels in each of said frames.

9. The optical character recognition system of claim 8, further including means for dividing said frame into a plurality of cells so that said cells are aligned along an axis perpendicular to the direction of scanning said text; and means for determining the percentage of said pixels below a predetermined threshold within each of said cells relative to the total number of pixels below a predetermined threshold within said frame.

10. The optical character recognition system of claim 9, wherein said means for determining the percentage of said pixels below a predetermined threshold within each of said cells relative to the total number of cells below a predetermined threshold within said frame includes means for determining the percentile of said pixels below a predetermined threshold within each of said cells relative to the total number of pixels between said cell and one referenced end of said frame.

11. The optical character recognition system of claim 5, wherein said means for generating data representing optically scanned text as a function of a single independent variable also includes means for generating the data as a function of the derivative across the dimensions of a feature vector.

12. The optical character recognition system of claim 5, wherein said means for generating data representing optically scanned text as a function of a single independent variable also includes means for generating the data as a function of the derivative of each feature across adjacent frames.

13. The optical character recognition system of claim 6, wherein said means for generating data representing optically scanned text as a function of a single independent variable also includes means for generating the data as a function of the local slope and correlation across a window comprising a plurality of said cells.

14. The optical character recognition system of claim 1, wherein said means for providing a probabilistic paradigm so as to determine said text from said data includes means for providing a 1D hidden Markov model for each of the characters to be recognized.

15. The optical character recognition system of claim 14, wherein each of said hidden Markov models is defined by a plurality of states.

16. The optical character recognition system of claim 15, wherein the number of states for each of said hidden Markov models is the same.

17. The optical character recognition system of claim 15, wherein the parameters for each of said states of each hidden Markov model is context dependent.

18. The optical character recognition system of claim 14, further including means for defining a context-dependent character model for each possible character of said text.

19. The optical character recognition system of claim 1, wherein said means for providing a probabilistic paradigm so as to determine said text from said data includes a language model.

20. The optical character recognition system of claim 19, wherein said language model is an n-gram model.

21. The optical character recognition system of claim 20, wherein said language model is a bigram model.

22. The optical character recognition system of claim 20, wherein said language model is a trigram model.

23. An optical character recognition system according to claim 1, wherein each of said frames is divided into a plurality of cells, and said means for generating data includes means for determining the vertical derivative of intensity in the vertical direction across said cells.

24. An optical character recognition system according to claim 23, wherein each of said frames is divided into a plurality of cells, and said means for generating data includes means for determining the vertical derivative of intensity in the vertical direction across said cells, wherein said horizontal and vertical derivatives of intensity provide a measure of boundaries between the light and dark portions of the text.

25. An optical character recognition system according to claim 1, wherein said frames are overlapping, and said means for generating data includes means for determining the horizontal derivative of intensity in the horizontal direction across overlapping frames.

26. An optical character recognition system according to claim 1, wherein each of said frames is divided into a plurality of cells, and said means for generating data includes means for determining the local slope and correlation of any line within a window of a plurality of such cells so as to determine the angle of said line.

27. An optical character recognition system according to claim 1, wherein each of said characters is an Arabic character.

28. An optical character recognition system according to claim 1, wherein each of said characters is a Chinese character.

29. A method of recognizing text regardless of the script or language of the text and without segmenting the text by character or word, said method comprising:

scanning successive frames of a predetermined height and width of each line of the text in the direction of each line so as to generate data relating to all of the characters of the text independent of the script or language of the text, wherein the data is a function of a single independent variable in one direction, said variable being a function of a feature vector representing a plurality of elements, each element being a function of the percentile height below which a prespecified percentage of black pixels lies; and determining from the data each character of text based upon a predetermined probabilistic paradigm.

30. A method according to claim 29, wherein each of said characters is an Arabic character.

31. A method according to claim 29, wherein each of said characters is a Chinese character.

32. An optical character recognition system for recognizing each character of a text, comprising:

means for (a) determining the position of each line of characters of the text and (b) scanning each line of text;

data generating means for generating data representing all of the optically scanned characters of the text as a function of a single independent variable in one direction, said data generating means comprising scanning means for scanning said text (a) line by line in the same direction as said line and (b) in successive frames of a predetermined height and width independent of the script and language of said text, but a function of the font size of the characters;

means for dividing each of said frames into an array of pixels;

means for dividing said frame into a plurality of cells so that said cells are aligned along an axis perpendicular to the direction of scanning said text;

means for determining the percentage of said pixels below a predetermined threshold within each of said cells relative to the total number of pixels below a predetermined threshold within said frame; and means for providing a probabilistic paradigm so as to determine each of said characters of said text from said data;

wherein said data generating means includes means for generating the data as a function of the intensity in each of said pixels in each of said frames.

33. An optical character recognition system for recognizing each character of a text, comprising:

means for (a) determining the position of each line of characters of the text and (b) scanning each line of text;

data generating means for generating data representing all of the optically scanned characters of the text as a function of a single independent variable in one direction, said data generating means comprising scanning means for scanning said text (a) line by line in the same direction as said line, (b) in successive frames of a predetermined height and width independent of the script and language of said text, but a function of the font size of the characters, (c) so that the frames overlap and (d) each of said frames is divided into a plurality of cells; and means for providing a probabilistic paradigm so as to determine each of said characters of said text from said data, wherein said means for generating data representing optically scanned text as a function of a single independent variable also includes means for generating the data as a function of the derivative across the dimensions of a feature vector.

34. An optical character recognition system according to claim 33, further including said scanning means including means for dividing each said frame into a plurality of cells.

35. An optical character recognition system for recognizing each character of a text, comprising:

means for (a) determining the position of each line of characters of the text and (b) scanning each line of text;

data generating means for generating data representing all of the optically scanned characters of the text as a function of a single independent variable in one direction, said data generating means comprising scanning means for scanning said text (a) line by line in the same direction as said line, (b) in successive frames of a predetermined height and width independent of the script and language of said text, but a function of the font size of the characters, and (c) so that the frames overlap; and means for providing a probabilistic paradigm so as to determine each of said characters of said text from said data, wherein said data generating means includes means for generating the data as a function of the derivative of each feature across adjacent frames.

36. An optical character recognition system for recognizing each character of a text, comprising:

means for (a) determining the position of each line of characters of the text and (b) scanning each line of text;

data generating means for generating data representing all of the optically scanned characters of the text as a function of a single independent variable in one direction, said data generating means comprising scanning means for scanning said text (a) line by line in the same direction as said line, (b) in successive frames of a predetermined height and width independent of the script and language of said text, but a function of the font size of the characters, (c) so that the frames overlap, and (d) so that each frame is divided into a plurality of cells so that said cells are aligned along an axis perpendicular to the direction of scanning said text; and means for providing a probabilistic paradigm so as to determine each of said characters of said text from said data;

wherein said data generating means includes means for generating the data as a function of the local slope and correlation across a window comprising a plurality of said cells.

* * * * *